May 9, 1967 E. HOFFMANN 3,319,007
ARRANGEMENT FOR OPERATIONALLY MATCHING
DIFFERENT TELEPHONE SYSTEMS
Filed Jan. 29, 1963
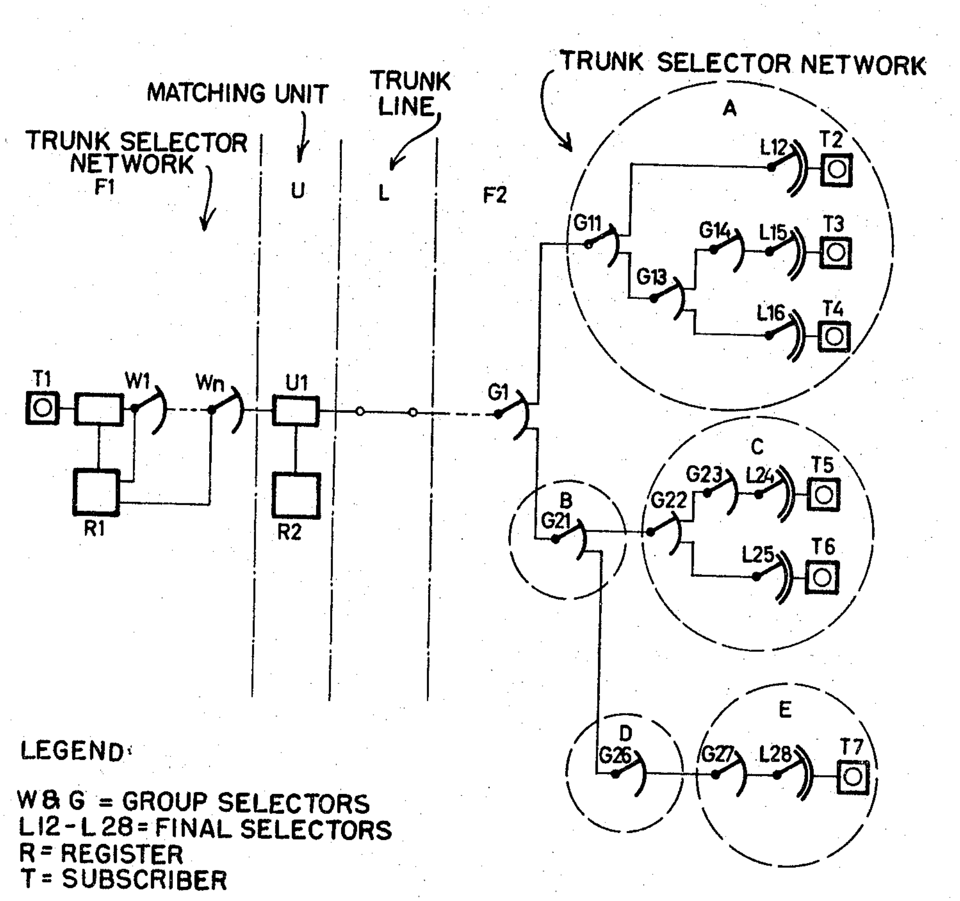

United States Patent Office 3,319,007

Patented May 9, 1967

3,319,007

ARRANGEMENT FOR OPERATIONALLY MATCHING DIFFERENT TELEPHONE SYSTEMS

Erik Hoffmann, Munich, Germany, assignor to Siemens & Halske Aktiengesellschaft Berlin and Munich, a corporation of Germany Filed Jan. 29, 1963, Ser. No. 254,777

Claims priority, application Germany, Feb. 14, 1962, S 78,027

2 Claims. (Cl. 179—16)

The invention disclosed herein relates to a circuit arrangement for communication systems, especially telephone systems, and is particularly concerned with a circuit arrangement for operationally matching different kinds of telephone systems having subscriber lines which are connected to several mutually interconnected exchanges, the call code digit numbers of which may be for destination codes as well as for subscriber call numbers non-uniform as desired or necessarily uniform.

It is often desirable to interconnect two telephone networks in which the numbers of digits necessary to identify subscribers in some exchanges is less than the number required to identify others.

There are telephone systems known, comprising automatic connection devices and switching-through devices, for example, selectors, which are operationally set in accordance with selection impulses transmitted from calling stations. The advantage of such systems resides in that the capacity thereof can be enlarged as desired, without requiring substantial changes in existing exchanges, and in that the digits of the subscriber numbers may be made as large as desired and suitable, by the use of correspondingly many selection stages and also differently large, depending upon local requirements of an exchange.

There are also telephone systems known which employ digit storers, for example, central registers, at the start of connection paths.

For example, the entire information required for extending a connection is recorded in a register system, and the most appropriate or most favorable one of several possible connection paths is thereupon ascertained for extending the connection. The time during which central devices are seized or occupied is to be held as short as possible, and it is therefore in register systems necessary to ascertain the extent of a complete and sufficient selection information, which is processed, whereupon the central device is placed in idle condition in readiness to serve for another call. The completeness of the selection information is ascertained, for example, by counting the selection impulse series (digits). Such register systems therefore provide, as a rule, for a uniform number of digits in the subscriber numbers which consequently include in part socalled "blind" digits. The completeness of a selection information is referred to as "selection termination."

An advantage of register systems, which is due to the fact that the building up of connections is independent of the selection speed of a calling party, resides in the possibility of selecting and seizing from several possible paths for the respective connection, the most appropriate and most favorable path, for example, the shortest path, thus permitting particularly efficient utilization of the trunk lines of the system.

The possibility of enlarging as desired the capacity of local exchanges and of utilizing to the greatest extent the toll trunk networks account for the extensive use of local exchanges which operate with direct selection and which are mutually interconnected over toll selection register systems. In such a combination of a register system and a direct selection system, the entire selection information must necessarily always be processed by the register, that is, it must be received and extended thereby, and a selection termination cannot be ascertained by the register by counting off the impulse series in connection with a definite, predetermined impulse series number, since the number of impulse series (digits) in the local exchanges with direct selection system is not uniform; accordingly, a "selection termination signal" is in such systems given from the switching member from which the destination point can be directly reached, for example, from the connector, rearwardly over the extended connection path to the toll exchange register.

The object of the invention is to mutually match telephone systems having for the ascertaining of the termination of the number selection, uniform numbers of digits, with telephone systems having non-uniform numbers of digits and operating with rearwardly transmitted selection termination signals.

This object is achieved by supplementing the respective sum of digit numbers of destination code number and subscriber call number for the selection of a subscriber of a telephone network having call numbers with non-uniform numbers of digits, from a telephone network having call numbers with uniform numbers of digits, by filling digits which are added to a subscriber call number and suppressed at the transition from the network with uniform digit call numbers to the network with non-uniform digit call numbers, the suppression or deletion of selection digits being respectively initiated or effected by the selection termination signal received from the telephone network or system having call numbers with non-uniform numbers of digits.

One of the advantages of the invention resides in the uniform digit number of call numbers for extending connections to subscribers in a system having call numbers with non-uniform digits numbers, from subscribers in a system having call numbers with uniform numbers of digits, in which they are necessary for recognizing the completeness of the selection information. Another advantage of the invention resides in the fact that the filling digits which are inserted into the call numbers for the extension of connections to subscribers of a system operating with call numbers having non-uniform numbers of digits, from subscribers of a system operating with call numbers having uniform numbers of digits, need not be transmitted over the line or trunk path which interconnects the two telephone systems, since such filling numbers are deleted by the selection termination signals received from the system to which a call is being extended. This makes it possible to reduce the seizure time of such line paths, the maintenance of which entails particularly in the case of intercontinental connections, extraordinarily high costs, by reducing the time required for extending calls, which cannot be charged to calling parties and therefore represent losses for the operators of the respective systems.

Further details and features will appear from the appended claims and from the description which is rendered below with reference to the accompanying drawing showing in block diagram manner an example of an embodiment of the invention with details and components only which are required for an understanding thereof.

Two trunk selector networks F1 and F2 are illustrated. The trunk selector network F1 is of the kind in which every call number is made up from the same number of digits. The trunk selector network F2 is of the kind in which call numbers of some subscribers have fewer digits than the call numbers of other subscribers. Consider the case where subscriber T1 contacts a subscriber T2 in the trunk selector network F2 by means of a call number which is compounded from the following succession of numbers: the national code number for the trunk selector network F2 as determined in the trunk selector network F1; the regional code number for the regional telephone network to which the subscriber T2 is connected, this reion being determined in the trunk selector network F2; ne subscriber number of the desired subscriber T2, as determined in the latter's regional telephone network; and number of fill-in digits by means of which the digits constituting the dialling information for identifying the desired subscriber T2 in his trunk selector network F2 are upplemented to give a maximum number of digits required in the network. Subscriber T1 is first of all connected to a register R1. This subscriber then dials the entire call number, compounded in the manner just described, into the register. This fills the register so that he desired connection is switched through; this switching s exchange-controlled by means of exchange setting elements (not shown) allotted to the register R1, via selectors, a matching unit U1, the trunk line L to an exchange group selector G1, in the trunk selector network F2. The matching unit U1 has allotted to it at least one common register R2 (possibly several of these) in which the digits to be transmitted to the trunk network F2 are temporarily stored. It is possible to do without this intermediate storage if the register R1 is arranged to be capable of the task of register R2, namely that of suppressing dialled digits.

The dialled digits transmitted via the matching unit U1 and the register R2, through the trunk line L to the trunk selector network F2, operate selectors in this latter network and by this means create the desired connection.

A number of group selectors G— and final selectors L— are illustrated, to which the exchange positions A . . . E are allotted. The regional selector networks, A, C, E, containing line selectors, are of various sizes, i.e., the subscribers are reached via varying numbers of selector stages. As a consequence of this, the numbers of digits for establishing routing to subscribers in the trunk selector network F2 also vary. If one digit is processed in each group selector G— and if two digits are received by each final selector L— then, in the trunk selector network F2, the subscriber T2 is reached by four digits, the subscriber T3 by six and the subscriber T4 by five.

We will now assume that the aforementioned maximum number of dialled digits in the trunk selector network F2 is six. Accordingly, the call number by means of which the subscriber T2 is contacted from the trunk selector network F1, is supplemented with two fill-in digits, and one fill-in digit is needed in the case of subscriber T4. During the build-up of the connection, the final selector, e.g., L12, sends out an end-of-dialling signal on or just after receipt of the second dialled digit and in this way signals that the subscriber connection has been reached and that further digits are not necessary for the establishment of the connection. This end-of-dialling signal is received by the matching unit U1 and passed on to the register R2 in which transmission of the remaining dialled digits (the fill-in digits) is suppressed, or the digits are erased; the register then switches itself off.

Similarly, a matching unit with a register for erasing dialling digits when an end-of-dialling signal is received may be provided at the other end of the trunk line, or at both ends, or alternatively the task of digit suppression may be undertaken by a suitably constructed register in the trunk selector system F1, e.g., the register R1 may be so suitably constructed.

Provision is also made in this example for spacing out the transmission of the digits with pauses of various lengths. The duration of the pauses during which no end-of-dialling signal is expected from the trunk selector network F2 is designed to be as short as is necessary to accord with the usual requirements of dialling systems for trouble-free operation of the circuit elements in the connection. The duration of those pauses during which an end-of-dialling signal may be received from the trunk selector system F2 is made longer; this duration is designed to ensure that an end-of-dialling signal can be transmitted back to the originating register and any necessary erasure of the remaining digits (the fill-in digits) carried out before any of these are transmitted. The digits may be transmitted in the form of current pulses or they may be transmitted in the form of a multifrequency code.

Details of the circuit arrangements of the individual connection devices have been omitted as they are well known and understood.

Changes may be made within the scope and spirit of the appended claims which define what is believed to be new and desired to have protected by Letters Patent.

I claim:

1. A method of operationally matching a plurality of different kinds of telephone systems having subscriber lines which are respectively allocated to mutually interconnected exchanges, in which subscribers at one exchange operating with a uniform number of digits are connectible by a trunk and under the control of dialling by those subscribers to the subscribers of a plurality of other exchanges, which other exchanges operate with destination call codes and a non-uniform number of subscriber line digits such that fewer dialled digits are necessary to identify some subscribers than are necessary to identify others, comprising, in the selection of a subscriber of one of said other exchanges, the steps of supplementing the respective sum of the number of digits of the destination code and the number of digits of a subscriber line of said one of said other exchanges with fill-in digits, producing at said one of said other exchanges a selection termination signal indicating receipt of the required number of digits for the selection operation thereat, extending said selection termination signal rearwardly to a suppression point rearwardly disposed at least to the transition point from said one exchange to said one of said other exchanges, and suppressing at said suppression point transmission of said fill-in digits to said one of said other exchanges upon receipt of such selection termination signals at said suppression point.

2. A method according to claim 1, comprising the additive step of securing the rearward extension of selection termination signals from said one of said other exchanges at the transition point, at which digits are transmitted, by extending the pauses ahead of the impulse series corresponding to the filling digits.

References Cited by the Examiner

UNITED STATES PATENTS

| | | | |
|---|---|---|---|
| 2,787,665 | 4/1957 | Oberman | 179—18 |

FOREIGN PATENTS

| | | |
|---|---|---|
| 984,258 | 2/1965 | Great Britain. |
| 1,144,785 | 3/1963 | Germany. |

KATHLEEN H. CLAFFY, *Primary Examiner*.

WILLIAM C. COOPER, *Examiner*.